United States Patent [19]

Han

[11] Patent Number: 5,510,849

[45] Date of Patent: Apr. 23, 1996

[54] CIRCUIT AND METHOD FOR GENERATING CAPTION SIGNAL IN VIDEO SIGNAL PROCESSING SYSTEM

[75] Inventor: Seok J. Han, Kyungki-Do, Rep. of Korea

[73] Assignee: Goldstar Co., Ltd, Seoul, Rep. of Korea

[21] Appl. No.: 274,316

[22] Filed: Jul. 13, 1994

[30] Foreign Application Priority Data

Jul. 15, 1993 [KR] Rep. of Korea ................... 13328/1993

[51] Int. Cl.$^6$ ..................................................... H04N 5/44
[52] U.S. Cl. ........................... 348/569; 348/177; 358/335
[58] Field of Search ..................................... 348/177, 569, 348/468, 589, 600, 232, 563, 184, 189, 180, 460; 358/335; H04N 5/44

[56] References Cited

U.S. PATENT DOCUMENTS

| | | | |
|---|---|---|---|
| 4,837,623 | 6/1989 | Motoyama | 348/569 |
| 4,907,082 | 3/1990 | Richards | 348/569 |
| 4,996,598 | 2/1991 | Hara | 348/589 |
| 5,113,259 | 5/1992 | Romesburg et al. | 348/589 |
| 5,134,486 | 7/1992 | Suzuki et al. | 348/569 |
| 5,270,800 | 12/1993 | Sweet | 348/589 |

*Primary Examiner*—Victor R. Kostak

[57] ABSTRACT

A circuit and a method for generating a caption signal in a video signal processing system such as a video cassette recorder or a camcorder availably connected to a caption television. The circuit comprises a caption data storage unit for storing caption data into which a message to be displayed as a caption on a screen is coded, a caption microcomputer for reading the caption data from the caption data storage unit and generating a plurality of control signals, a caption code encoder for encoding the read caption data from the caption microcomputer into the caption signal under the control of the caption microcomputer and generating a caption region signal designating a region of a video signal into which the caption signal is to be combined, and a mixing unit for combining the caption signal from the caption code encoder into the video signal when the caption region signal from the caption code encoder is high. The caption data storage unit is adapted to store the caption data corresponding to system manual guide information or an error message.

7 Claims, 11 Drawing Sheets

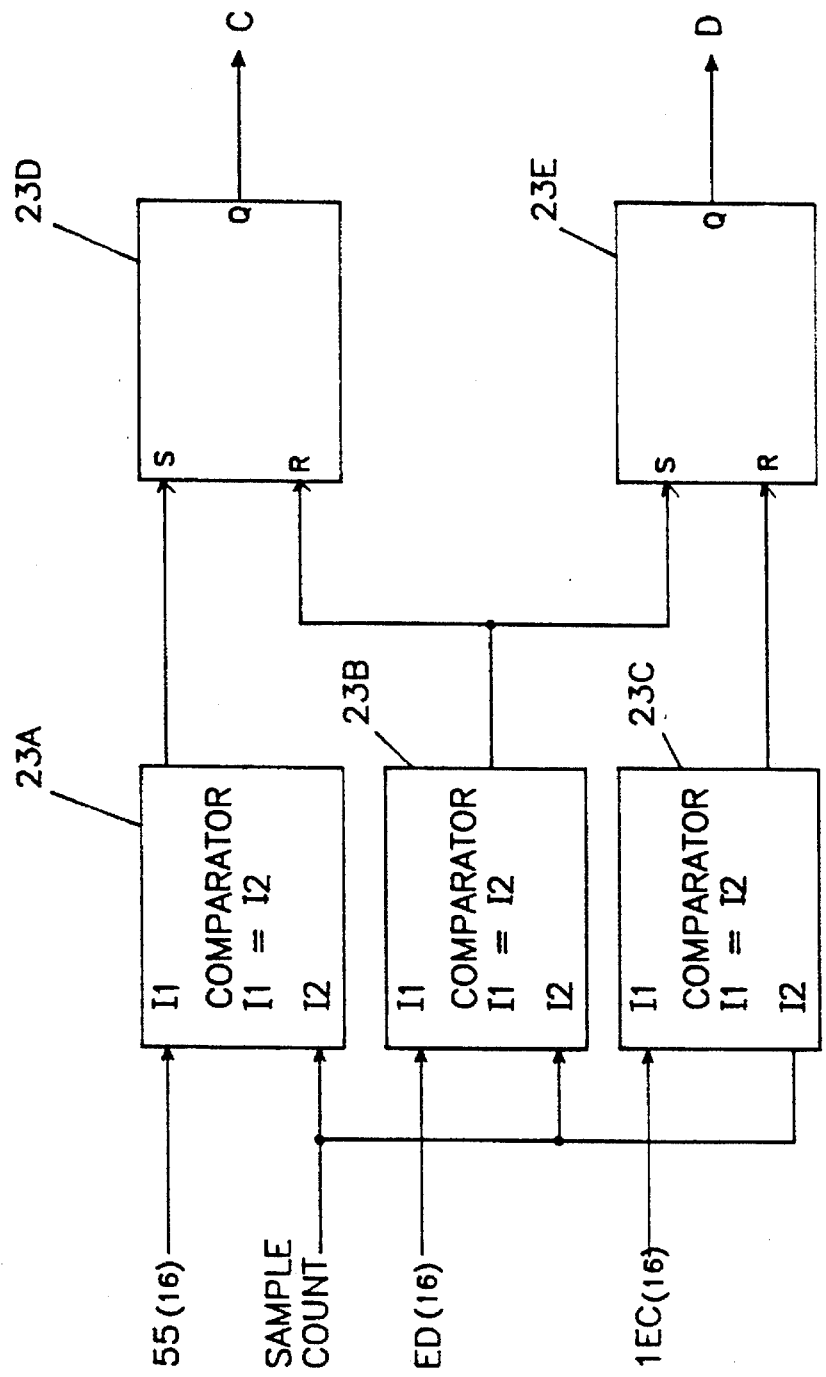

CV

A

C

E

H

B

D

F

I

END

J

START

CV

G

K

CVout

FIG. 9A Hsync 1

FIG. 9B t1 Vsync 2

1st FIELD

FIG. 9C Hsync 2

FIG. 9D t2 Vsync 2

2nd FIELD t1≪t2

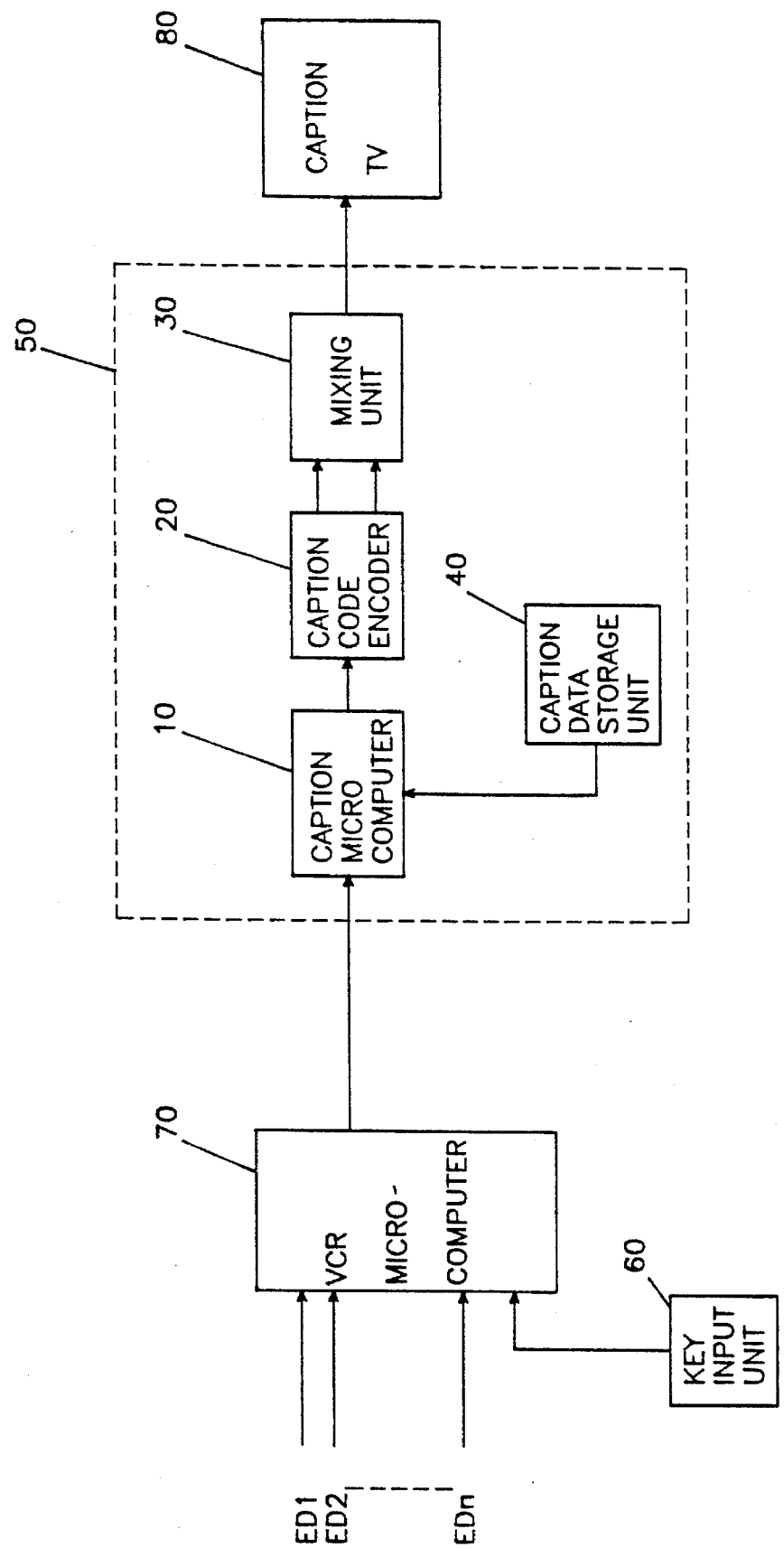

FIG.13

| NOW TAPE IS NOT PRESENT IN VCR |

| INSERT TAPE INTO VCR AND PLAY AGAIN |

CIRCUIT AND METHOD FOR GENERATING CAPTION SIGNAL IN VIDEO SIGNAL PROCESSING SYSTEM

BACKGROUND OF THE INVENTION

1. Field of the Invention

The present invention relates in general to the generation of a caption signal in a video signal processing system such as a camcorder or a video cassette recorder (VCR), and more particularly to a circuit and a method for generating the caption signal in the video signal processing system in which information to inform the user, such as a system manual, an error message and etc., can be displayed as a caption on a screen of a caption television (TV).

2. Description of the Prior Art

Generally, a caption TV comprises a caption decoder for decoding caption data combined with a video signal. The decoded caption data from the caption decoder is displayed as a caption on a screen of the caption TV. In the case where such a caption TV is availably connected to a video signal processing system such as a VCR or a camcorder, only caption data combined with a broadcasting signal from a broadcasting station is decoded and then displayed as the caption on the screen of the caption TV. Namely, the video signal processing system such as the VCR or the camcorder has no function capable of generating desired information as a caption signal for itself for a user's convenience. For this reason, the caption function cannot be variously utilized conveniently.

SUMMARY OF THE INVENTION

Therefore, the present invention has been made in view of the above problem, and it is an object of the present invention to provide a circuit and a method for generating a caption signal in a video signal processing system such as a camcorder or a VCR in which desired information is generated as the caption signal for a user's convenience.

In accordance with one aspect of the present invention, there is provided a circuit for generating a caption signal in a video signal processing system, comprising caption data storage means for storing caption data into which a message to be displayed as a caption on a screen is coded; a caption microcomputer for reading the caption data from said caption data storage means and generating a plurality of control signals; caption code encoding means for encoding the read caption data from said caption microcomputer into the caption signal under the control of said caption microcomputer and generating a caption region signal designating a region of a video signal into which the caption signal is to be combined; and mixing means for combining the caption signal from said caption code encoding means into the video signal when the caption region signal from said caption code encoding means is high.

In accordance with another aspect of the present invention, them is provided a method of generating a caption signal in a video signal processing system, comprising the steps of (a) recognizing the contents to be displayed as a caption on a screen and outputting a control signal to a caption microcomputer to display a corresponding message on the screen; (b) reading caption data corresponding to the message from caption data storage means and transferring the read caption data to caption code encoding means; (c) encoding the transferred caption data into the caption signal; and (d) combining the caption signal with a video signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings which are given by way of illustration only, and thus are not limitative of the present invention, and, in which:

FIG. 3 is a detailed block diagram of a region signal output unit in FIG. 2;

FIGS. 9A to 9D are waveform diagrams illustrating a manner for detecting a 21st line of a first field of a video signal in accordance with the present invention;

FIG. 10 is a block diagram illustrating an embodiment of the present invention in which the caption signal generation circuit of FIG. 1 is applied to a VCR;

FIG. 13 is a view illustrating an example of the error message display performed by the method of FIG. 11.

DETAILED DESCRIPTION OF THE PREFERRED EMBODIMENTS

Figure 1:
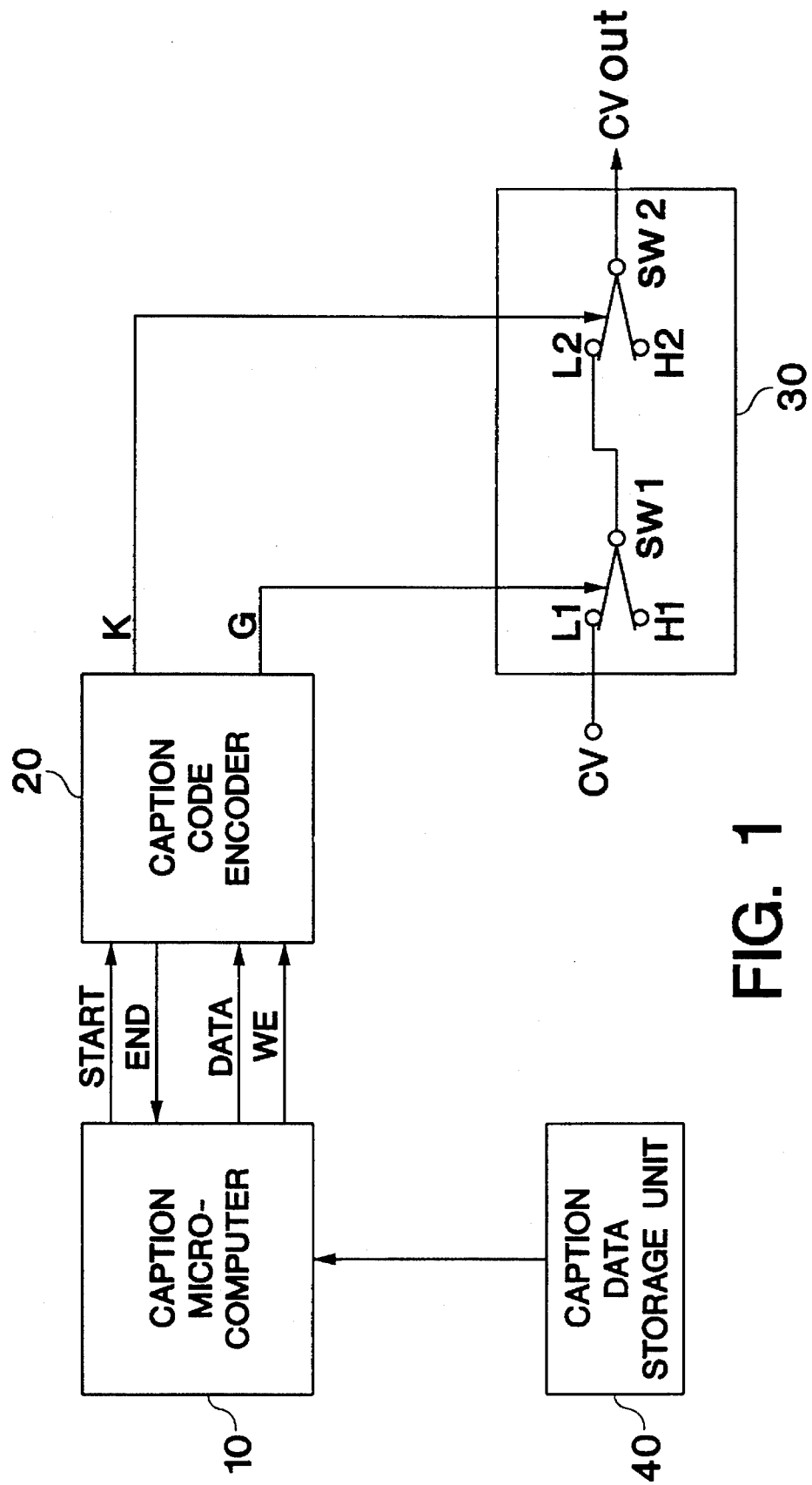
FIG. 1 is a block diagram of a caption signal generation circuit in accordance with the present invention.

Referring to FIG. 1, there is shown a block diagram of a caption signal generation circuit in accordance with an embodiment of the present invention. As shown in this drawing, the caption signal generation circuit comprises a caption data storage unit 40 for storing caption data into which a message to be displayed as a caption on a screen of a caption TV (not shown) is coded, and a caption microcomputer 10 for reading the caption data from the caption data storage unit 40, transferring the read caption data to a caption code encoder 20 and generating a start signal START and a write enable signal WE to control an operation of the caption code encoder 20.

The caption code encoder 20 is adapted to encode the caption data DATA from the caption microcomputer 10 into a caption signal K of a standard format in response to the start signal START and the write enable signal WE from the caption microcomputer 10, generate a caption region signal G designating a region of a video signal CV into which the caption signal K is to be combined and output an end signal END to the caption microcomputer 10 when the encoding of the caption data is ended.

Also, the caption signal generation circuit comprises a mixing unit 30 for outputting the video signal CV out when the caption region signal G from the caption code encoder 20 is low, blocking the input of the video signal CV when the caption region signal G from the caption code encoder 20 is high and performing a switching operation in response to the caption signal K from the caption code encoder 20 to combine the caption signal K into the video signal CV.

The operation of the caption signal generation circuit with the above-mentioned construction in accordance with the present invention will hereinafter be described.

Figures 4A, 4B, 4C:
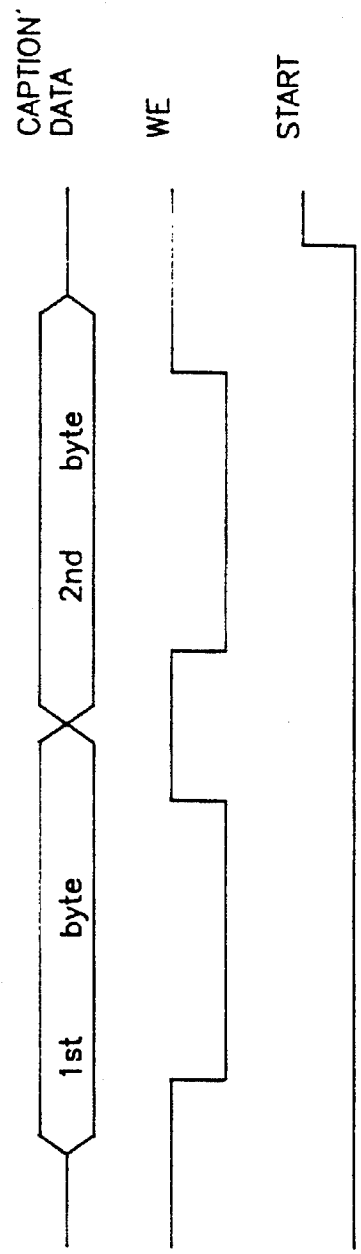
FIGS. 4A to 4C are timing diagrams illustrating the transfer of caption data and control signals from a caption microcomputer in FIG. 1 to the caption code encoder.

In the case of intending to display desired information, to inform the user, as the caption on the screen of the caption TV, the caption microcomputer 10 reads the caption data, into which the message corresponding to the desired information is coded, from the caption data storage unit 40 in the unit of 2 bytes and transfers the read caption data to the caption code encoder 20. Also, the caption microcomputer 10 outputs the start signal START and the write enable signal WE to the caption code encoder 20 to control the operation thereof. FIGS. 4A to 4C are timing diagrams illustrating the transfer of the caption data, the write enable signal WE and the start signal START from the caption microcomputer 10 to the caption code encoder 20. As shown in these drawings, the caption data of the 2 bytes from the microcomputer 10 is loaded into the caption code encoder 20 when the write enable signal WE from the microcomputer 10 is made active "low". The start signal START from the microcomputer 10 goes "high" after the caption data of the 2 bytes from the microcomputer 10 is input into the caption code encoder 20, thereby causing the caption code encoder 20 to begin to encode the caption data of the 2 bytes into the caption signal K.

Figure 2:
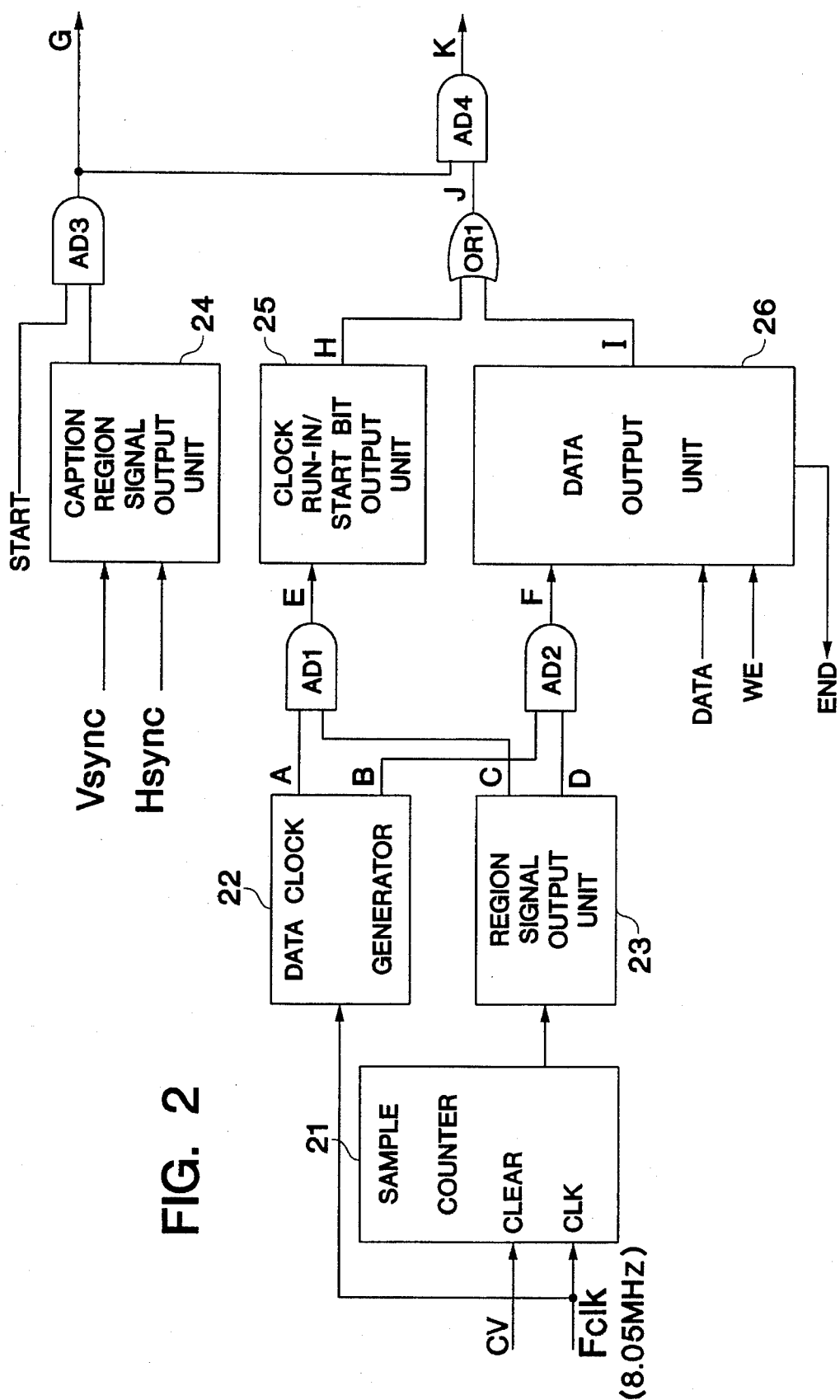
FIG. 2 is a detailed block diagram of a caption code encoder in FIG. 1.
Figure 5A:
FIGS. 5A to 5P are waveform diagrams of signals from components in FIG. 2.
Figure 5B:
Figure 5C:
Figure 5D:
Figure 5E:
Figure 5F:
Figure 5G:
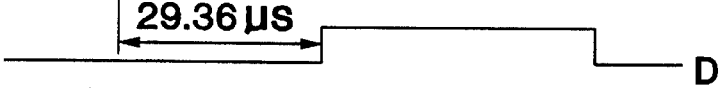
Figure 5H:
Figure 5I:
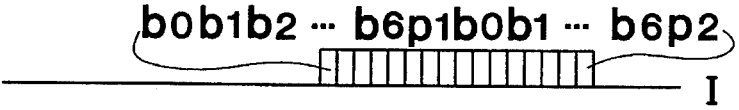
Figure 5J:
Figure 5K:
Figure 5L:
Figure 5M:
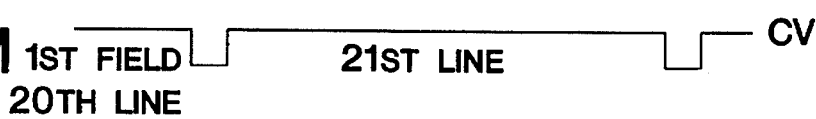
Figure 5N:
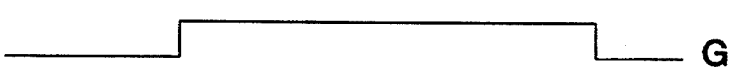
Figure 5O:
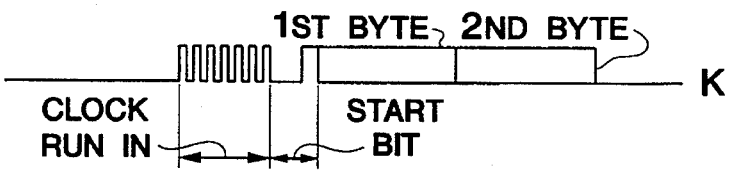
Figure 5P:
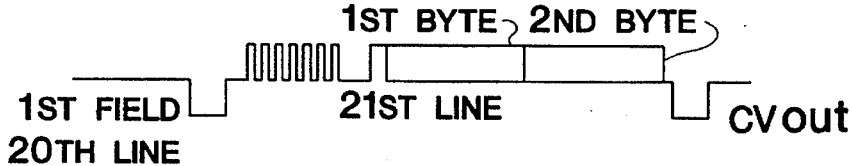

The caption code encoder 20 is adapted to combining the caption data from the caption microcomputer 10 into a 21st line of a first field of the video signal CV, as will hereinafter be described in more detail with reference to FIG. 2 and FIGS. 5A to 5P. FIG. 2 is a detailed block diagram of the caption code encoder 20 in FIG. 1. FIG. 5A is a waveform diagram of the video signal CV inputted to a sample counter 21, FIG. 5B is a waveform diagram of a clock signal of 1006 KHz which a data clock generator 22 produces by frequency-dividing a clock signal Fclk of a desired frequency (8.05 MHz) inputted thereto by 8, FIG. 5C is a waveform diagram of a signal containing a combining interval of a clock run-in signal and a start bit, FIG. 5D is a waveform diagram of a signal obtained by ANDing the signals as shown in FIGS. 5B and 5C, FIG. 5E is a waveform diagram of a signal obtained by combining the clock run-in signal and the start bit into the signal as shown in FIG. 5D, FIG. 5F is a waveform diagram of a clock signal of 503 KHz which the data clock generator 22 produces by frequency-dividing the clock signal Fclk of the desired frequency (8.05 MHz) inputted thereto by 16, FIG. 5G is a waveform diagram of a signal containing a combining interval of the caption data, FIG. 5H is a waveform diagram of a signal obtained by ANDing the signals as shown in FIGS. 5F and 5G, FIG. 5I is a waveform diagram of a signal obtained by combining the caption data into the signal as shown in FIG. 5H, FIG. 5J is a waveform diagram of the end signal END, FIG. 5K is a waveform diagram of a signal obtained by ORing the signals as shown in FIGS. 5E and 5I, FIG. 5L is a waveform diagram of the start signal START, FIG. 5M is a waveform diagram of a signal obtained by detecting the 21st line of the first field of the video signal, FIG. 5N is a waveform diagram of the caption region signal G, FIG. 5O is a waveform diagram of the caption signal K, and FIG. 5P is a waveform diagram of a video signal obtained by loading the caption signal as shown in FIG. 5O into the 21st line of the first field of the video signal CV.

Upon receiving the video signal CV as shown in FIG. 5A, the sample counter 21 is cleared at a falling edge of the received video signal CV to count the clock signal Fclk of the desired frequency (8.05 MHz), which is also applied to the data clock generator 22. The data clock generator 22 produces the clock signals A and B of 1006 KHz and 503 KHz as shown in FIGS. 5B and 5F by frequency-dividing the clock signal Folk by 8 and 16, respectively.

A region signal output unit 23 is adapted to determine a region in which the caption data of the 2 bytes and the clock run-in signal which is the preceding information designating a bit rate of the caption data are to be placed, as will hereinafter be described in more detail with reference to FIG. 3 which is a detailed block diagram of the region signal output unit 23.

Figure 6:
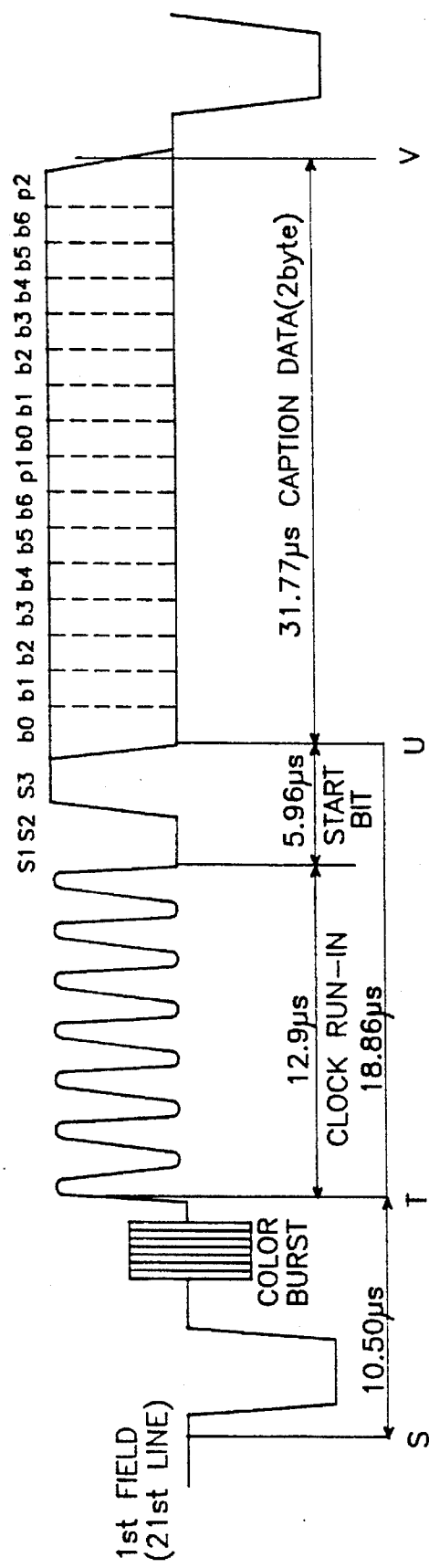
FIG. 6 is a waveform diagram illustrating a standard format of a caption signal.

The standard format of the caption signal is sequentially comprised of a color burst, the clock run-in signal, the start bit and the caption data of the 2 bytes, beginning with a falling edge of a 20th line of the first field of the video signal, as shown in FIG. 6 which is a waveform diagram illustrating the standard format of the caption signal. Starting from the falling edge of the 20th line of the first field of the video signal, an interval S–T (10.50 μs) to the color burst, an interval S–U (29.361 μs) to the start bit and an interval S–V (61.13 μs) to the caption data can be converted into hexadecimal numbers on the basis of the clock signal to the sample counter 21 as follows:

$$10.50 \ \mu s = 85_{(10)} = 55_{(16)}$$

$$29.36 \ \mu s = 236_{(10)} = ED_{(16)}$$

$$61.13 \ \mu s = 492_{(10)} = 1ED_{(16)}$$

where, 10: decimal numbers and 16: hexadecimal numbers.

In the region signal output unit 23, comparators 23A–23C receive standard values $55_{(16)}$, $ED_{(16)}$ and $1EC_{(16)}$ of the caption signal converted into the hexadecimal numbers, respectively, and a sample count from the sample counter 21 in common and compare the received two inputs with each other, respectively. Namely, the comparator 23A receives the hexadecimal number $55_{(16)}$ of the interval S–T and the sample count from the sample counter 21 at its input terminals I1 and I2, respectively, and provides an output signal which is high when the two inputs are the same, whereas low when not the same. In other words, the output signal from the comparator 23A goes high when the interval of 10.50 μs has elapsed, an output signal from the comparator 23B goes high when the interval of 29.36 μs has elapsed and an output signal from the comparator 23C goes high when the interval of 61.13 μs has elapsed.

The output signals from the comparators 23A and 23B are applied to a flip-flop 23D. The output signal from the comparator 23B is also applied to a flip-flop 23E, which also receives the output signal from the comparator 23C. An output signal from the flip-flop 23D remains at its low state as input terminals S and R of the flip-flop 23D remain at their low states. When the interval of 10.50 μs has elapsed tinder this condition, the output signals from the comparators 23A and 23B to the input terminals S and R of the flip-flop 23D go high and low, respectively, thereby causing the output signal from the flip-flop 23D to be changed from the low state to a high state. When the interval of 29.36 μs has elapsed while the output signal from the flip-flop 23D remains at its high state, the output signals from the comparators 23A and 23B to the input terminals S and R of the flip-flop 23D go low and high, respectively, thereby causing the output signal from the flip-flop 23D to be changed from the high state to the low state. Namely, the flip-flop 23D outputs the signal C as shown in FIG. 5C in which an interval T–U from a start point of the clock run-in signal to an end point of the start bit is high.

In a similar manner to that of the flip-flop 23D, the flip-flop 23E outputs the signal D as shown in FIG. 5G in which the combining interval of the caption data is high.

Turning again to FIG. 2, an AND gate AD1 is adapted to AND the output signal A from the data clock generator 22 as shown in FIG. 5B and the output signal C from the region signal output unit 23 as shown in FIG. 5C in order to produce the signal E as shown in FIG. 5D for forming the clock run-in signal CRI and the start bit. An AND gate AD2 is adapted to AND the output signal B from the data clock generator 22 as shown in FIG. 5F and the output signal D from the region signal output unit 23 as shown in FIG. 5G in order to produce the signal F as shown in FIG. 5H for encoding the caption data.

Figure 7:
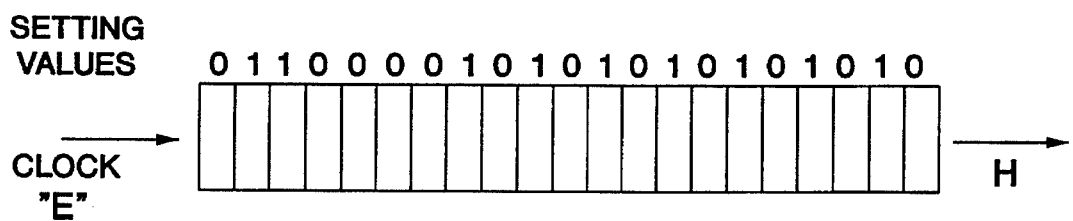
FIG. 7 is a block diagram illustrating a shift register in a clock run-in/start bit output unit in FIG. 2.

A clock run-in/start bit output unit 25 includes a shift register, as shown in FIG. 7, for combining the clock run-in signal and the start bit. Setting values of the shift register are shifted in response to the output signal E from the AND gate AD1, resulting in the generation of the clock run-in signal CRI and the start bit as shown in FIG. 5E.

Figure 8:
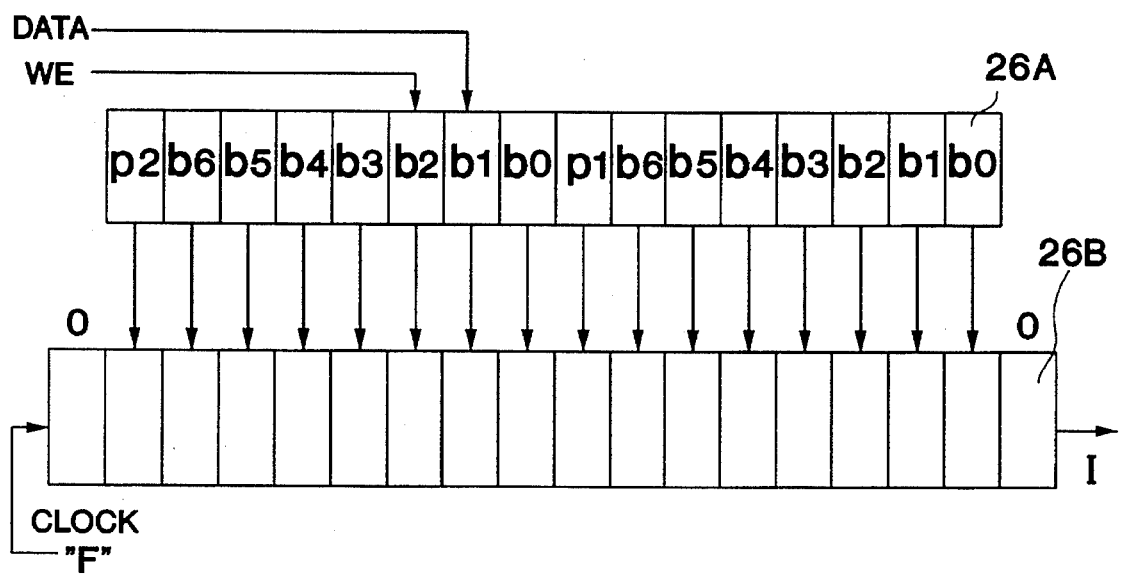
FIG. 8 is a detailed block diagram of a data output unit in FIG. 2.

A data output unit 26 includes, as shown in FIG. 8, a latch 26A and a shift register 26B. The latch 26A is adapted to latch the caption data from the caption microcomputer 10 in response to the write enable signal WE from the caption microcomputer 10. The shift register 26B is adapted to combine the caption data latched by the latch 26A. The combined caption data is shifted in the shift register 26B according to the output signal F from the AND gate AD2. As a result, the shift register 26B provides the signal I as shown in FIG. 5I. When the combining of the caption data is ended, the data output unit 26 outputs the end signal END as shown in FIG. 5J to the caption microcomputer 10 to inform the caption microcomputer 10 of the end of the caption data loading.

An OR gate OR1 is adapted to OR the output signal H from the clock run-in/start bit output unit 25 and the output signal I from the data output unit 26 to output the signal J as shown in FIG. 5K.

A caption region signal output unit 24 is adapted to detect the 21st line of the first field of the video signal into which the caption data is to be combined. FIGS. 9A to 9D are waveform diagrams illustrating a manner for detecting the 21st line of the first field of the video signal in accordance with the present invention. As shown in these drawings, a time difference t1 between horizontal and vertical synchronous signals Hsync1 and Vsync1 of the first field of the video signal is different from a time difference t2 between horizontal and vertical synchronous signals Hsync2 and Vsync2 of a second field of the video signal. Using this difference between the time differences t1 and t2, the caption region signal output unit 24 distinguishes the first field from the second field and counts the horizontal synchronous signal Hsync1 of the first field on the basis of the vertical synchronous signal Vsync1 thereof, so as to detect the 21st line of the first field. As a result, the caption region signal output unit 24 outputs the signal, as shown in FIG. 5M, designating the 21st line of the first field of the video signal. An AND gate AD3 is adapted to AND the output signal from the caption region signal output unit 24 as shown in FIG. 5M and the start signal START as shown in FIG. 5L in order to produce the caption region signal G as shown in FIG. 5N.

An AND gate AD4 is adapted to AND the output signal G from the AND gate AD3 and the output signal J from the OR gate OR1 in order to produce the caption signal K, as shown in FIG. 5O, which is to be input into the 21st line of the first field of the video signal.

Referring again to FIG. 1, the mixing unit 30 includes switches SW1 and SW2. When the caption region signal G from the caption code encoder 20 is low, a movable terminal a1 of the switch SW1 is connected to a fixed terminal L1 thereof, thereby causing the inputted video signal CV to be outputted directly through fixed and movable terminals L2 and a2 of the switch SW2. If the caption region signal G from the caption code encoder 20 becomes high as shown in FIG. 5N, the movable terminal a1 of the switch SW1 is connected to a fixed terminal H1 thereof, thereby causing the input of the video signal CV to be blocked. Also, the switch SW2 is switched in response to the caption signal K from the caption code encoder 20 as shown in FIG. 5O to output the resultant video signal CVout, as shown in FIG. 5P, which is obtained by combining the caption signal K into the 21st line of the first field of the video signal CV.

Noticeably, the combining of the caption signal every the 21st line of the first field of the video signal makes it possible to load 30 caption signals per a second at the maximum. Therefore, 60 characters can be transmitted in the unit of a second at the maximum in English.

Referring to FIG. 10, there is shown a block diagram illustrating an embodiment of the present invention in which the caption signal generation circuit of FIG. 1 is applied to a VCR. In this drawing, the caption signal generation circuit of FIG. 1 and the caption TV are designated by the reference numerals 50 and 80, respectively. A plurality of error detectors ED1–EDn are disposed in desired positions of the VCR to detect operational errors of the VCR. A VCR microcomputer 70 is provided to control the entire operation of the VCR in response to error detect signals from the error detectors ED1–EDn and a key input signal from a key input unit 60 such as, for example, a remote controller. The caption TV 80 is adapted to display the caption signal from the mixing unit 30 as the caption on its screen together with the video signal.

The operation of the embodiment of the present invention with the above-mentioned construction will hereinafter be described in detail with reference to FIGS. 11 and 12, which are flowcharts illustrating methods of displaying an error message and system manual guide information in accordance with the embodiment of the present invention, respectively.

In the case of being applied to the VCR, the function of the present invention is generally classified into two types. One function of the present invention is to display the error message according to the flowchart of FIG. 11 when the operational errors of the VCR are generated. The other function of the present invention is to display the system manual guide information according to the flowchart of FIG. 12 in response to a user's requirement.

Figure 11:
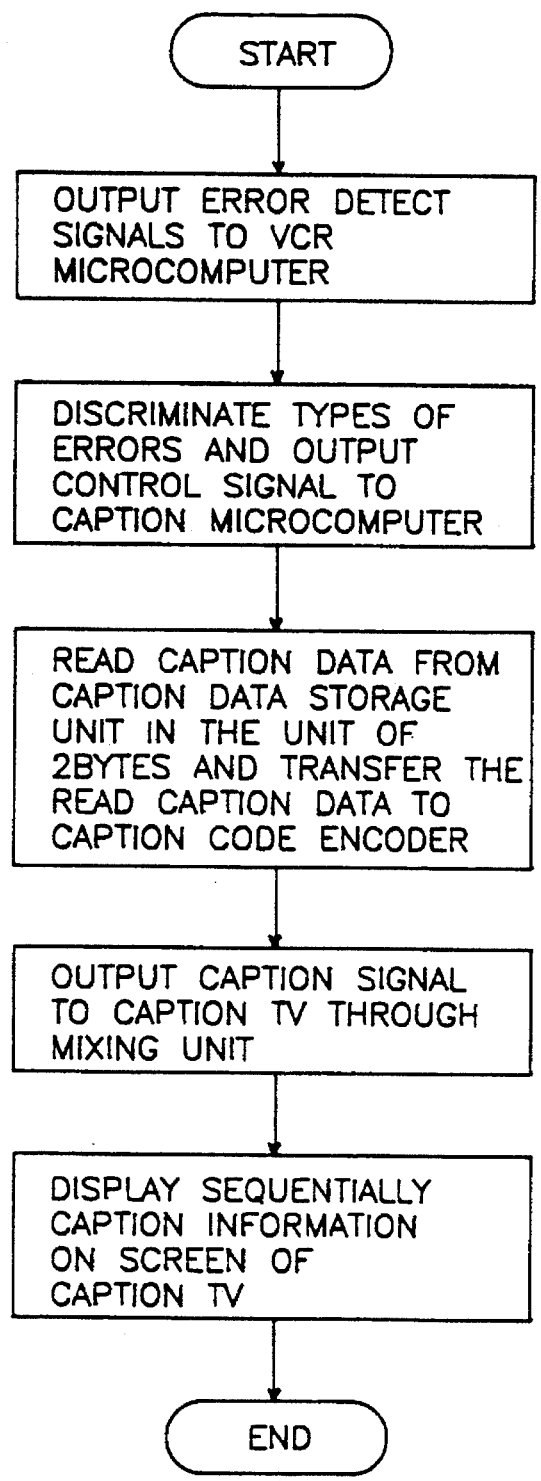
FIG. 11 is a flowchart illustrating a method of displaying an error message in accordance with the embodiment of the present invention.

First, the method of displaying the error message will be mentioned with reference to FIG. 11.

Upon the generation of the operational errors of the VCR, the error detectors ED1– EDn detect the generated errors and output the error detect signals to the VCR microcomputer 70. The VCR microcomputer 70 discriminates the types of the generated errors on the basis of the error detect signals from the error detectors ED1–EDn and outputs a control signal to the caption microcomputer 10 in accordance with the discriminated result to display the corresponding error message as the caption on the screen of the caption TV 80. In response to the control signal from the VCR microcomputer 70, the caption microcomputer 10 reads the caption data corresponding to the error message from the caption data storage unit 40 in the unit of the 2 bytes and transfers the read caption data to the caption code encoder 20. The caption microcomputer 10 also outputs the start signal START and the write enable signal WE to the caption code encoder 20. As mentioned previously, the caption code encoder 20 outputs the caption region signal as shown in FIG. 5N and the caption signal as shown in FIG. 5O to the mixing unit 30. Then, the mixing unit 30 loads the caption signal into the 21st line of the first field of the video signal from the VCR and outputs the resultant video signal to the caption TV 80. As a result, the caption TV 80 displays sequentially the caption information from the mixing unit 30 on its screen to allow the user to recognize the contents of the currently generated errors. FIG. 13 is a view illustrating an example of the error message display performed by the method of FIG. 11. In this drawing, the error message is displayed according to the above procedure in the case where a play button is pushed by the user under the condition that a video tape is not inserted into the VCR.

Figure 12:
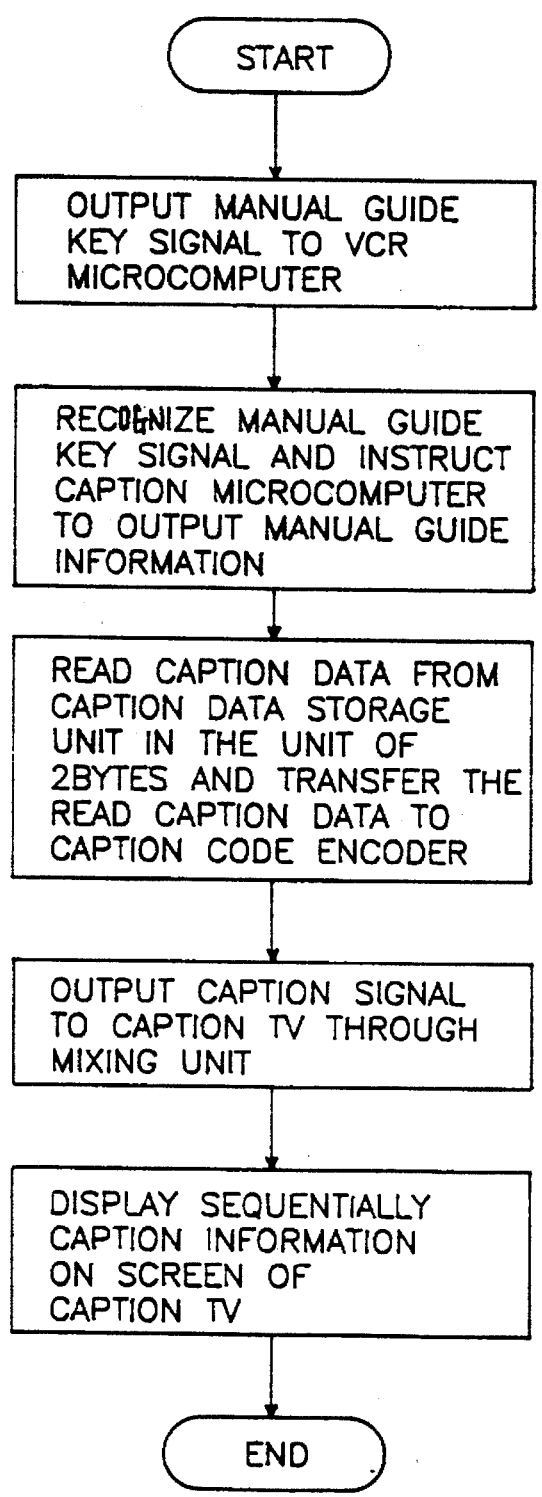
FIG. 12 is a flowchart illustrating a method of displaying system manual guide information in accordance with the embodiment of the present invention.

Next, the method of displaying the system manual guide information will be mentioned with reference to FIG. 12.

When the user pushes a system manual guide key on the key input unit 60 to inquire how to operate the VCR, the corresponding key signal is applied to the VCR microcomputer 70. In response to the system manual guide key signal from the key input unit 60, the VCR microcomputer 70 instructs the caption microcomputer 10 to output the system manual guide information. Upon receiving the instruction from the VCR microcomputer 70, the caption microcomputer 10 reads the caption data corresponding to the system manual guide information from the caption data storage unit 40 in the unit of the 2 bytes and transfers the read caption data to the caption code encoder 20. The caption microcomputer 10 also outputs the start signal START and the write enable signal WE to the caption code encoder 20. As mentioned previously, the caption code encoder 20 outputs the caption region signal as shown in FIG. 5N and the caption signal as shown in FIG. 5O to the mixing unit 30. Then, the mixing unit 30 loads the caption signal into the 21st line of the first field of the video signal from the VCR and outputs the resultant lo video signal to the caption TV 80. As a result, the caption TV 80 displays sequentially the caption information from the mixing unit 30 on its screen to allow the user to recognize the system manual guide information.

The present invention can be applied to all systems (for example, an audio/video system) availably connected to the caption TV, to provide desired information for the user.

As apparent from the above description, according to the present invention, the desired information such as the error message, the system manual and etc. regarding the video signal processing system availably connected to the caption TV can be displayed as the caption through the caption TV. Therefore, the caption function can be utilized more variously and conveniently for the user's convenience.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A circuit for generating a caption signal in a video signal processing system, comprising:

caption data storage means for storing caption data into which a message to be displayed as a caption on a screen is coded, the caption data including guide information for a video processing system and information relating to operational errors arising from said system;

a caption microcomputer for reading the caption data from said caption data storage means and generating a plurality of control signals;

caption code encoding means for encoding the read caption data from said caption microcomputer into the caption signal under the control of said caption microcomputer and generating a caption region signal designating a region of a video signal with which the caption signal is to be combined; and mixing means for combining the caption signal from said caption code encoding means with the video signal when the caption region signal from said caption code encoding means is high, said mixing means including a plurality of switches.

2. A circuit for generating a caption signal in a video signal processing system, comprising:

caption data storage means for storing caption data into which a message to be displayed as a caption on a screen is coded;

a caption microcomputer for reading the caption data from said caption data storage means and generating a plurality of control signals;

caption code encoding means for encoding the read caption data from said caption microcomputer into the caption signal under the control of said caption microcomputer and generating a caption region signal designating a region of a video signal with which the caption signal is to be combined;

mixing means for combining the caption signal from said caption code encoding means with the video signal when the caption region signal from said caption code encoding means is high;

a plurality of error detection means disposed in desired positions of the video signal processing system for detecting operational errors of the video signal processing system; and a microcomputer disposed in the video signal processing system for discriminating the types of the detected operational errors on the basis of error detect signals from said error detection means and outputting a control signal to said caption microcomputer in accordance with the discriminated result to display a corresponding error message as the caption on the screen.

3. A circuit for generating a caption signal in a video signal processing system, as set forth in claim 2, wherein said microcomputer disposed in the video signal processing system is adapted to recognize a system manual guide key signal and output a control signal to said caption microcomputer to display system manual guide information as the caption on the screen.

4. A circuit for generating a caption signal in a video signal processing system, as set forth in claim 3, wherein said caption data storage means is adapted to store the caption data corresponding to the system manual guide information.

5. A circuit for generating a caption signal in a video signal processing system, as set forth in claim 2, wherein said caption data storage means is adapted to store the caption data corresponding to the error message.

6. A method of generating a caption signal in a video signal processing system, comprising the steps of:
   (a) recognizing the contents to be displayed as a caption on a screen and outputting a control signal to a caption microcomputer to display a corresponding message on the screen;
   (b) reading caption data corresponding to the message from caption data storage means and transferring the read caption data to caption code encoding means, the caption data including guide information for a video processing system and information relating to operational errors arising from said system;
   (c) encoding the transferred caption data into the caption signal;
   (d) combining the caption signal with a video signal, by mixing; and
   (e) switching in response to the caption signal.

7. A method of generating a caption signal in a video signal processing system, comprising the steps of:
   (a) recognizing the contents to be displayed as a caption on a screen and outputting a control signal to a caption microcomputer to display a corresponding message on the screen;
   (b) reading Caption data corresponding to the message from caption data storage means and transferring the read caption data to caption code encoding means;
   (c) encoding the transferred caption data into the caption signal;
   wherein the contents to be displayed as the caption on the screen are operational errors of the video signal processing system.

* * * * *